STONE & WARD.
Saw Gummer.
No. 19,265. Patented Feb. 2, 1858.
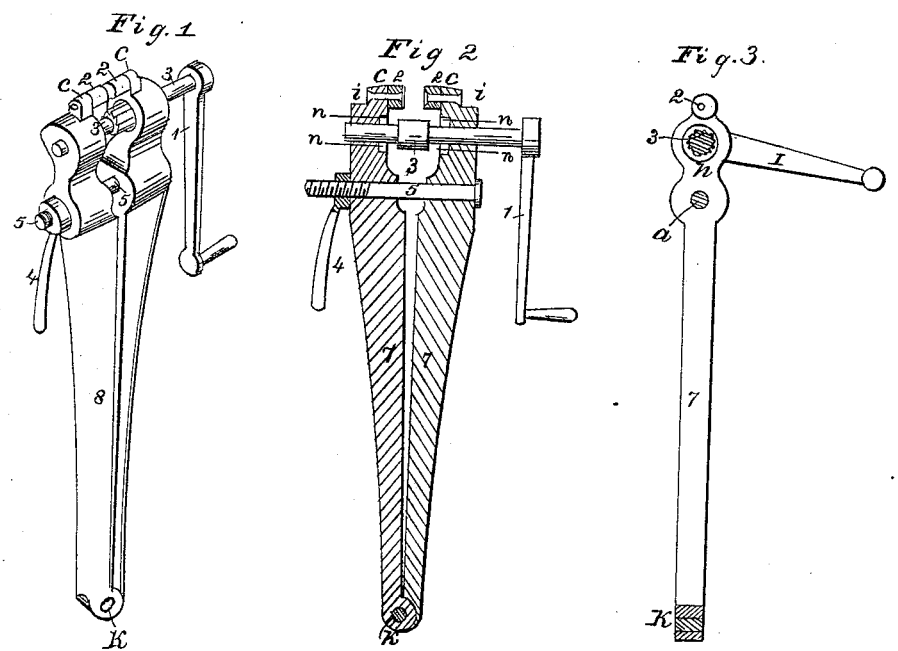

UNITED STATES PATENT OFFICE.

N. F. STONE AND W. C. WARD, OF MENARD COUNTY, ILLINOIS.

SAW-GUMMER.

Specification of Letters Patent No. 19,265, dated February 2, 1858.

*To all whom it may concern:*

Be it known that we, NATHANIEL F. STONE and WILEY C. WARD, of the county of Menard and State of Illinois, have invented a new and useful Machine for Cutting Out the Gums of Circular and other Saws, which we designate as "The Rotary Gummer and Incisor;" and we do hereby declare that the following is a clear, full, and exact description of the construction and operation of the same, reference being had to the annexed drawings, making a part of this specification, in which—

Figure 1, represents a perspective view of the apparatus complete. Fig. 2, represents a vertical section. Fig. 3 represents an elevation of the inner face of one of the legs of the apparatus, and Fig. 4, represents a rest which may be used for some purposes in place of the disk clamps.

Our invention relates to a saw gummer provided with disk clamps that will allow the gummer to turn around said clamps as a center, and provided further with a bur, clamping screw and hinge, so that the entire apparatus may be used as a fastener to the saw plate, a gummer, and a lever to bring and keep the bur in contact with the metal to be cut by it.

To enable others skilled in the art to make and use our invention we will proceed to describe the same with reference to the drawings.

A pair of lever arms 7, are first provided and hinged together as at *k*. Near the upper ends of these levers, a screw bolt or rod 5, passes through them furnished with a screw winch 4, for bringing said levers together. Above the screw bolt and winch, a shaft 3, has its bearings in said levers 7, so as to freely turn therein by the action of a crank 1, or its mechanical equivalent. On this shaft 3, is placed, (between the levers 7 which are bent outward for that purpose) a bur 3′, which may be secured to said shaft in any proper manner—said bur being provided with cutting teeth in the ordinary well known way. The inner faces of the levers 7, where the shaft 3, passes through them, are countersunk as at *n* so that the bur 3′, as its shaft is slipped through its bearings longitudinally, may pass into the countersinks, and thus present a clear cutting surface to the entire saw plate, and without leaving a fin on the edges of the gullet of the saw tooth. On the extreme upper ends of the levers 7, are two projections *c, c,*—one on each lever, through which pass respectively a shaft *i*, that supports a disk 2, as seen in the Figs. 1, 2, 3. These disks 2, 2, may either turn with or on their shafts *i i;* and are made concave on their opposite faces, so as to have an edge bearing upon the saw plate between them. It is obvious from this construction that the gummer may be rigidly clamped to the saw plate by the disks 2, 2, and yet the operator by catching hold of the levers 7, may press the bur into, or draw it away from the metal to be cut by it, or cause it to cut anywhere in the arc of a circle, whose center is at the center of said disk-clamps.

For some purposes, a rest or support *d*, as shown in Fig. 4, may be convenient, instead of the clamps—said rest however, having its journals *e, e*, to turn in the projections *c, c,* as in the above described cases of the clamps 2, 2.

The operation of the machine is as follows: The blade or plate of the saw is clamped between the teeth (2, 2) by means of the screw wrench 4, at the point where the gumming is to be done. The bur or cutter (3′) is then rotated by the crank (1) or otherwise the operator holding the jaws (7 7) in his left hand. As the metal is cut away from the gullet of the tooth, he continues to raise or lower the gummer so as to keep the bur in contact with the metal to be cut away. The teeth or clamps (2, 2) turning in their sockets to admit of this operation. If a rest or stirrup is preferred to the clamps (2) then that shown in Fig. 4 may be substituted for the clamps.

Having thus fully described the construction and operation of our saw gummer, what we claim therein as new and desire to secure by Letters Patent is—

So combining the levers, screw clamp, bur, and clamping disks in one machine, as that the operator may keep the bur up to the saw plate, while the apparatus is clamped thereto, as herein set forth and explained.

NATHANIEL F. STONE.
WILEY C. WARD.

Witnesses:
THOS. L. HARRIS,
CORNELIUS ROURKE.